UNITED STATES PATENT OFFICE.

ANANIAS D. MILLER, OF MOUNT PLEASANT, PENNSYLVANIA.

FLUXING AND SEPARATING COMPOUND.

SPECIFICATION forming part of Letters Patent No. 700,529, dated May 20, 1902.

Application filed March 13, 1901. Serial No. 50,999. (No specimens.)

*To all whom it may concern:*

Be it known that I, ANANIAS D. MILLER, a citizen of the United States, residing at Mount Pleasant, in the county of Westmoreland and State of Pennsylvania, have invented a new and useful Fluxing and Separating Compound, of which the following is a specification.

This invention relates to fluxing and separating compounds designed for use in the treatment of copper, lead, silver, gold, and other ores to promote the fusion thereof and insure the separation and concentration of the metal from the various substances with which it is associated in the ore or matte.

To this end the invention contemplates a simple and highly effective composition possessing special utility in the melting and separation of ores of copper and other metals.

My present invention provides a composition of matter which not only effects the ready fusion of the ores, but at the same time insures the separation of the silica or earthy materials and similar substances from the metals and causes the separation and concentration of a maximum percentage of the metals contained in the ore.

A further object of the invention is to produce a compound which will not only provide for the separation of the metal, silica, sulfids, and other substances, but will also provide for the separation of the pure metal from the matte itself, thus accomplishing a separation of the metal in one operation and effecting the concentration of the several metals in separate strata or layers above or below the other substances in the matte, according to the relative specific gravity of the various component substances of the ore.

The production of this fluxing and separating compound has been rendered possible by the discovery that asbestos when combined with a suitable flux—as, for instance, borax—will quickly reduce the ores to a liquid state at a comparatively low temperature and will effect a thorough separation of the metals from the silicates. The flux facilitates the fusing of the ore and of the asbestos.

For the purpose of promoting the activity of both the asbestos and the flux to effect the separation of a maximum percentage of metal contained in the ore or matte, as well as to reduce the time necessary to effect such separation, and to effectually dispose of the sulfur and other gases I prefer to add an oxygen-furnishing agent, and I have found in my experiments that permanganate of potash is a chemical well suited for my purpose, as it readily gives off oxygen and by the promotion of combustion serves to greatly reduce the time necessary to effect a complete separation of the various component substances of the matte.

The precise proportions of the several ingredients are not important, as in carrying out my invention the proportions will vary in accordance with the character of the ore; but usually the proportions are about one dram of asbestos to a pound of the flux or borax and two per cent. of the potassium permanganate to the entire mixture, the potassium permanganate being preferably sprinkled over the asbestos. As stated, however, these proportions will vary in accordance with the properties of the individual substances to be separated, it being simply necessary to employ sufficient of the fluxing agent to insure the fusion of the metals and the proper running of the asbestos, and it is therefore evident that all necessary variations of proportions may be effected without departing from the scope of the invention.

It may be further explained that the compound may be used to advantage in the treatment of lead ores, silver ores, gold ores, including sulfids, arsenides, antimonides, and other non-metallic compounds of the metals, such as are found in natural ores or in artificial products. In the ultimate development of the invention the reductions and equations are brought about primarily through the medium of the oxygen-furnishing agent, which, as stated, is preferably permanganate of potash. This oxidizer furnishes the oxygen which combines with the sulfur, arsenic, and antimony and various other oxidizable impurities of the ores and removes them as oxids. The gangue and other less oxidizable impurities of the ores are fluxed off by the magnesia and borax or other flux, which allows the metals to separate either in the metallic form or in the form of a matte.

It is impossible to state the chemical equations for all ores and artificial products in the fluxing of the impurities with the fluxing composition claimed herein; but for illustrative purposes a few of the typical reactions which I believe to appear in the use of the fluxing compound may be stated as follows:

*Types for Sulfids and Sulfur Compounds.*

Chacocite:
$$Cu_2S + {}_2O = {}_2Cu + SO_2.$$
Covellite:
$$CuS + {}_2O = Cu + SO_2.$$
Chalcopyrite and type for copper matte:
$$CuFeS_2 + {}_4O = Cu + Fe + {}_2SO_2.$$
Erubescite:
$$Cu_3FeS_3 + {}_6O = 3Cu + Fe + {}_3SO_2.$$
Galena:
$$PbS + {}_2O = Pb + SO_2.$$
Argentite:
$$Ag_2S + {}_2O = {}_2Ag + SO_2, \&c.$$

*Types for Arsenides.*

Whitneyite:
$$Cu_{18}As_2 + {}_3O = 18Cu + As_2O_3.$$
Mispickle:
$${}_2Fe_2AsS_2 + {}_{11}O = 4Fe + As_2O_3 + {}_4SO_2, \&c.$$

Similar reactions take place in connection with antimony, tellurium, and other compounds of the metals, either natural or artificial.

I make no claim in this application to the novel process practiced by me in utilizing the fluxing and separating compound, inasmuch as said process is described and claimed in my concurrent application for Letters Patent filed March 13, 1901, Serial No. 51,000.

What I claim is—

1. A fluxing and separating compound consisting of asbestos and a flux.

2. A fluxing and separating compound consisting of asbestos and borax.

3. A fluxing and separating compound consisting of asbestos, a flux, and an oxygen-furnishing agent.

4. A fluxing and separating compound consisting of asbestos, borax, and an oxygen-furnishing agent.

5. A fluxing and separating compound consisting of asbestos, borax, and potassium permanganate.

6. A fluxing and separating compound consisting of asbestos, a flux, and potassium permanganate.

In testimony that I claim the foregoing as my own I have hereto affixed my signature in the presence of two witnesses.

ANANIAS D. MILLER.

Witnesses:
H. M. CORWIN,
E. J. KENT.